United States Patent
Leahy et al.

(10) Patent No.: US 9,473,920 B2
(45) Date of Patent: Oct. 18, 2016

(54) PERSONAL SECURITY ALERT AND MONITORING APPARATUS

(71) Applicant: POM-CO PARTNERS, INC., Clifton Park, NY (US)

(72) Inventors: Andrew Leahy, Clifton Park, NY (US); Lukas Lampe, Clifton Park, NY (US)

(73) Assignee: POM-CO PARTNERS, INC., Clifton Park, NY (US)

( * ) Notice: Subject to any disclaimer, the term of this patent is extended or adjusted under 35 U.S.C. 154(b) by 0 days.

(21) Appl. No.: 14/804,860

(22) Filed: Jul. 21, 2015

(65) Prior Publication Data

US 2016/0029195 A1 Jan. 28, 2016

Related U.S. Application Data

(60) Provisional application No. 62/027,403, filed on Jul. 22, 2014.

(51) Int. Cl.
*H04W 4/22* (2009.01)
*H04M 1/725* (2006.01)
*H04W 4/02* (2009.01)

(52) U.S. Cl.
CPC .......... *H04W 4/22* (2013.01); *H04M 1/72538* (2013.01); *H04M 1/72547* (2013.01); *H04M 1/72569* (2013.01); *H04W 4/023* (2013.01)

(58) Field of Classification Search
CPC ....... H04W 4/22; H04W 4/02; H04W 4/023; H04M 1/72547; H04M 1/72538; H04M 1/72569

See application file for complete search history.

(56) References Cited

U.S. PATENT DOCUMENTS

| | | |
|---|---|---|
| 6,166,652 A | 12/2000 | Benvenuti |
| 7,015,817 B2 | 3/2006 | Copley et al. |
| 7,382,268 B2 | 6/2008 | Hartman |
| 7,479,889 B2 | 1/2009 | Kazdin et al. |
| 7,502,619 B1 | 3/2009 | Katz |
| D617,667 S | 6/2010 | Penix et al. |
| D618,121 S | 6/2010 | Penix et al. |

(Continued)

FOREIGN PATENT DOCUMENTS

| | | |
|---|---|---|
| GB | 2436908 A | 10/2007 |
| JP | 2008018205 A | 1/2008 |

OTHER PUBLICATIONS

International Search Report and Written Opinion for PCT application No. PCT/US15/41486, mailed on Sep. 30, 2015.

*Primary Examiner* — Joseph Dean, Jr.
(74) *Attorney, Agent, or Firm* — Schmeiser, Olsen & Watts, LLP

(57) ABSTRACT

A personal monitoring apparatus and methods of using the personal monitoring apparatus for contacting one or more third parties through wireless signals and/or a communication network in the event of an emergency. The personal apparatus comprises a data storage device configured to store information selected from the group consisting of user identification information, GPS location information, health information, insurance information, third party contact information and environmental information, a wireless transmitter connected to the data storage device, configured to transmit the information of the data storage device to a third party and an input device configured to simultaneously or near simultaneously activate the wireless transmitter, transmit the stored information of the data storage device and open a line of communication with the third party.

19 Claims, 10 Drawing Sheets

(56) References Cited

U.S. PATENT DOCUMENTS

| | | |
|---|---|---|
| 8,159,342 B1 | 4/2012 | Medina, III et al. |
| 8,188,837 B2 | 5/2012 | Patenaude et al. |
| 8,253,559 B2 | 8/2012 | Howard et al. |
| D671,091 S | 11/2012 | Hauser et al. |
| D671,092 S | 11/2012 | Hauser et al. |
| D671,093 S | 11/2012 | Hauser et al. |
| 8,351,895 B2 | 1/2013 | Penix et al. |
| D680,015 S | 4/2013 | Hauser et al. |
| D680,016 S | 4/2013 | Hauser et al. |
| 8,423,000 B2 | 4/2013 | Dhuna |
| 8,477,028 B2 | 7/2013 | Kuncl |
| 8,570,168 B2 | 10/2013 | Logan et al. |
| D695,258 S | 12/2013 | Hauser et al. |
| 8,938,210 B1 * | 1/2015 | Otto .................. H04W 4/22 455/404.1 |
| 2005/0009536 A1 * | 1/2005 | Ito .................. G06Q 30/02 455/456.1 |
| 2005/0071487 A1 * | 3/2005 | Lu .................. H04L 67/16 709/230 |
| 2005/0176402 A1 * | 8/2005 | Verloop .............. H04L 12/2854 455/404.1 |
| 2007/0247307 A1 | 10/2007 | Riep |
| 2008/0284587 A1 | 11/2008 | Saigh et al. |
| 2009/0160670 A1 | 6/2009 | Sipple |
| 2011/0130112 A1 | 6/2011 | Saigh et al. |
| 2012/0052836 A1 | 3/2012 | Buratti et al. |
| 2012/0214545 A1 | 8/2012 | Johnson |
| 2012/0225633 A1 | 9/2012 | Nichols |
| 2012/0258684 A1 | 10/2012 | Franz et al. |
| 2012/0322380 A1 | 12/2012 | Nannarone et al. |
| 2012/0329420 A1 | 12/2012 | Zotti et al. |
| 2013/0078942 A1 | 3/2013 | Owens et al. |
| 2013/0109375 A1 | 5/2013 | Zeiler et al. |
| 2013/0183924 A1 | 7/2013 | Saigh et al. |

* cited by examiner

PERSONAL SECURITY ALERT AND MONITORING APPARATUS

CROSS REFERENCE TO RELATED APPLICATIONS

This application claims the priority and benefit of U.S. Patent Application No. 62/027,403, entitled PERSONAL SECURITY ALERT AND MONITORING DEVICE, filed on Jul. 22, 2014, the content of which is incorporated herein by reference.

FIELD OF TECHNOLOGY

The following relates generally to an apparatus and method for providing personal security and monitoring services, and more specifically to embodiments of a monitoring apparatus equipped to transmit location information, personal information, health information, and request assistance from third parties.

BACKGROUND

Modern technology has brought us the capability to send and receive information wirelessly, over short and long distances. As technology has progressed, communication devices have become faster, more complicated, store more information and are able to include a vast number of features that allow individuals to communicate in many number of ways. Computing devices such as personal computers, cellular phones, smart phones, laptops and tablets have become ubiquitous amongst the general population and can be vital in situations where assistance may be needed. These computing devices however have been designed with features that are almost exclusively used during non-emergency situations. Computing devices such as smart phones and tablets can suffer drawbacks that may make them inaccessible, when an emergency arises. For instance, cellular phones and tablets may be out of reach or have limited battery remaining when an emergency arises. These computing devices may also have complex interfaces that may make it difficult for individuals to find and access the appropriate features during a stressful emergency situation. Often, individuals who are untrained or unprepared for an emergency situation that arises may suffer from an inability to properly communicate important details to emergency responders. Thus a need exists for a device that is easy to use, accessible and capable of providing the necessary information to emergency responders and third parties, even under the most stressful, dangerous and intimidating situations.

SUMMARY

A first aspect of this disclosure relates generally to a personal monitoring apparatus comprising a data storage device configured to store information selected from the group consisting of user identification information, GPS location information, health information, insurance information, third party contact information and environmental information a wireless transmitter connected to the data storage device, configured to transmit the information of the data storage device to a third party and an input device configured to simultaneously or near simultaneously activate the wireless transmitter, transmit the stored information of the data storage device and open a line of communication with the third party.

A second aspect of this disclosure relates generally to a method for using a personal monitoring apparatus comprising the steps of storing information on a data storage device of the personal monitoring apparatus, said information including user identification information, GPS location information, health information, insurance information, text, video, voice, third party contact information or environmental information; activating the personal monitoring apparatus, via an input device; transmitting, via a wireless transmitter, the information stored on the data storage device to a third party; and simultaneously or near simultaneously with the transmitting, opening a line of communication between the personal monitoring apparatus and the third party.

BRIEF DESCRIPTION OF THE DRAWINGS

Some of the embodiments will be described in detail, with reference to the following figures, wherein like designations denote like members:

FIG. 1b depicts a front view of the apparatus of FIG. 1a;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. The figures, in some cases, show overlapping components in assembly. The overlap is illustrative of an interference fit in which the components flex or otherwise accommodate the assembly of the components.

As a preface to the detailed description, it should be noted that, as used in this specification and the appended claims, the singular forms "a", "an" and "the" include plural referents, unless the context clearly dictates otherwise.

Figure 1A:
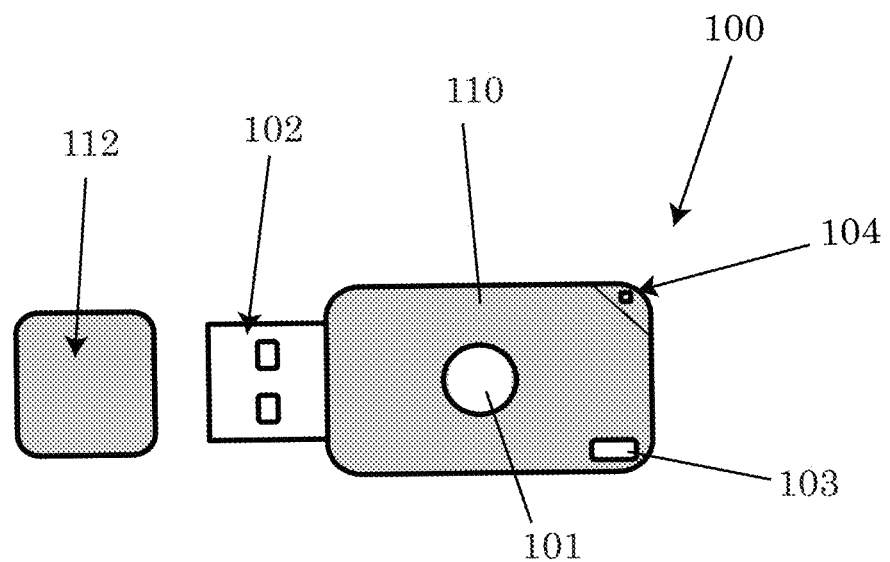
FIG. 1a depicts a top view of a personal monitoring apparatus.

Referring to FIG. 1a, which depicts an embodiment of a personal monitoring apparatus 100. The personal monitoring apparatus 100 may be any type of data storage device which may record, store, transmit or communicate information and data to another device, system, network, and third parties including but not limited to computing devices, computing systems, computer networks, cloud networks, emergency networks, government network, cellular networks, friends, family, relatives, emergency authorities and/or a second personal monitoring apparatus 401.

Any type of information, known to those in the art, can be stored, written or saved to the data storage of the monitoring apparatus 100. The data storage device of the apparatus may be any type of computer readable storage medium. Types of data storage devices may include any electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), NAND flash memory, a static random access memory (SRAM), a memory stick, a floppy disk, a mechanically encoded device.

The information stored, written or saved to the monitoring apparatus may be recorded, stored, transmitted, communicated to or accessed by a person, device, system, server, network or cloud network, either real or virtual. The information provided by apparatus 100 to the recipient person, device, system or network and may include information describing the owner or current user of the personal monitoring apparatus 100. This information may include a physical description, location information, a picture of the owner or current user of the apparatus 100, address information, one or more telephone numbers, student ID number, insurance information, third party contact information including contact information about friends, family or co-workers, and a log file providing information regarding previous information exchanges between the apparatus 100 and other recipients. The information provided stored or transmitted by the device may include any general information about the user's environment and the nature or reasons for the transmission of the information to the third party, including descriptions of the surrounding environment, hazardous conditions and details that may be pertinent for the recipient to determine the appropriate response, such as providing emergency assistance.

Embodiments of apparatus 100, may include a data storage device 110 having a flash based memory storage device such as a Universal Serial Bus (USB) flash drive form factor 102. Embodiments of the apparatus 100 may include a subscriber identity module (SIM) such as a SIM card 204 found in mobile network devices including cellular telephones, smartphones, tablet computers, palm pilots or other devices capable of interfacing with cellular telephone network or other mobile communications networks. The networks may include GSM, GPRS, CDMA, TDMA, mobitex, EDGE, high-speed circuit switched data (HSCSD), SMS, Universal Mobile Telecommunication System (UMTS), W-CDMA, LTE, or Flash-OFDM networks. In some embodiments, the SIM card 204 or other SIM device may be integrated with the data storage device 110 described above. In an embodiment of an apparatus containing a SIM card 204, the SIM card 204 may further store subscriber identification information or related keys which allow the apparatus 100 to access and/or be identified on a mobile communications network.

The SIM card 204 may be controlled by a logic board housed within the personal apparatus 100. The apparatus 100 may be configured to utilize the SIM card 204 and the SIM card's identifying information to send and receive mobile communications on a mobile communications network. Embodiment of the monitoring apparatus 100 may be able to send and receive communications between the servers of communications networks and a destination device. The personal monitoring apparatus may communicate with any known communications network in which the apparatus 100 may be configured to communicate with including those described throughout this application, such as Global System for Mobile Communications (GSM), General Packet Radio Service (GPSR), and Short Message Service (SMS).

The personal monitoring apparatus 100 may also include, in some embodiments, a Global Positioning system (GPS) having a GPS processor 205. The apparatus's 100 GPS processor 205 may be capable of transmitting, receiving and storing information regarding geographical location of the apparatus 100 via the GPS satellites orbiting above the Earth. The information from the GPS may be stored in the onboard memory of the GPS processor or it may be saved to data storage device 110 of the apparatus 100. In an alternative embodiment, the apparatus 100 may include an Assisted GPS (AGPS). The AGPS may download orbital information from the GPS satellites and store it in a database on the data storage device 110 of the apparatus 100 using a mobile communications network as GSM, CDMA, WCDMA, LTE or even using a radio based network such as Wi-Fi to send and receive the positioning data in less time than a GPS alone.

Embodiments of the personal monitoring device 100 may also be equipped with a wireless transmitting device. The transmitting device may be used to send and receive signals between one or more personal monitoring devices 100, one or more computing devices, computing networks, cloud networks, servers, receivers, transceivers or other devices capable of receiving information and data using wireless transmissions and signals. Embodiments of the wireless transmitting device may include transmitters, receivers or transceivers including those propagating a wireless signal, including but not limited to Bluetooth, Wi-Fi, Bluetooth low energy (BLE), RFID, CDMA, GSM, infrared (IR), broadcast radio, microwave transmission, satellite communications or any other known type of wireless signal capable of transmitting a signal.

Referring still to FIG. 1a, embodiments of apparatus 100 may further include a power source. The power source may be wireless or mobile in nature such as a battery. The power source may be rechargeable, or non-rechargeable. For example, a battery powered source may be a lithium battery, alkaline battery, nickel cadmium battery, nickel metal hydride (NiMH), zinc-carbon batteries or any other battery type known to those skilled in the art. In other embodiments, the form factor of the security apparatus 100 may include a small solar panel powering the circuit or an internal battery charged by light. The security apparatus 100 may not require large amounts of energy, but rather may be placed into a low power state while it is being not being used. The device may simply recharged using light to increase the internal power supply, similar to a light powered watch containing a photovoltaic module or solar panel.

The apparatus 100 may also be powered using other methods. For example, the apparatus 100 may be equipped with a port capable of receiving a power supply external to the apparatus, such as a power cable sized to fit within the port and supply power thereto. The external power supply, once connected to the apparatus, via the cable may begin recharging the internal power source of the apparatus. In the exemplary embodiment, the apparatus 100 may be a USB form factor having a USB interface plug 102. The USB plug 102 may draw power from a device or outlet equipped with port capable of mating with the USB plug. This may include any device containing a USB slot or port receiving power. Examples may include computer, electronic hardware such as DVD and Bluray players, television, automobiles, or USB power adapters. Once connected to the USB slot or port, the apparatus 100 may begin recharge its internal power source.

In some embodiments, the apparatus may perform a plurality of functions while recharging. The apparatus 100 may replenish its internal power supply and/or download, upload, transmit, send, receive information and save it to the data storage of the apparatus. In some embodiments, while being plugged in and recharged, the apparatus may perform a firmware update or software update. For example, after the USB plug 102 is inserted into a computing device, or network accessible device, the apparatus 100, via the USB plug may upload information stored in the data storage of the apparatus 100 to the computing device or network. Conversely, the apparatus may also receive information and download update to the hardware's firmware or software, storing it within the data storage 110 of the apparatus 100. Such stored information may include GPS information, updated firmware, API instructions, software updates, maps, personal identification information, text, video, audio or any other files. Examples of information that may be stored and later transmitted by the apparatus may include identifying images of the user, name of the user, address, telephone numbers, student identification number, social security number, health insurance id number, lists of one or more personal physicians and their contact information, preferred hospitals, known allergies and conditions, names and locations of parents, spouse, significant other or additional third parties that may be contacted in the event of an emergency.

Figure 1B:
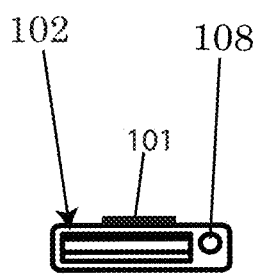

Referring to FIG. 1b, some embodiments of the apparatus 100 may contain a power source indicator 108. The power source indicator may be a light source, such as a light emitting diode (LED). The power source indicator 108 performs an action to signal to the user a status or condition. For example, the indicator 108 may light up, flash or change colors to indicate the status of the power source. The power indicator 108 may identify the apparatus 100 as being fully charged, charging or low on energy. The indicator 108 may also signal to the user based on the action of the indicator that the apparatus is reading, writing, downloading, uploading, transmitting, or receiving data or information. The indicator 108 may also inform a user of the apparatus that the apparatus 100 is updating the apparatus's firmware or software. In some embodiments, the Apparatus may also include a small display screen to indicate the amount of remaining power left in the power source or an action being performed by the apparatus.

Embodiments of the apparatus 100 may include additional structural features such as a key ring or chain port 104 for allowing the apparatus to be attached to another object. For example, the apparatus 100 may be placed on a key ring, an article of clothing or any other item that is normally carried on the individual. This may allow the apparatus 100 to be readily accessible or nearby allowing for quick activation in the event of an emergency or other situation where the use of the apparatus 100 may be needed.

Other features of embodiments of the apparatus 100 may include an instructional portion 106 alerting a non-owner of a found apparatus how to best communicate with the owner regarding the discovery of the lost item. The instructional portion 106 may be a sticker, etching, LCD, LED, or OLED screen, cathode ray tube (CRT), Nixie tube display, incandescent film display, gas discharge display, plasma display or any other means affixed to the apparatus 100 for communicating with an individual who has found the apparatus, instructions for returning it to the proper owner. An instructional portion 106 may provide the owner's contact information such as an email address, telephone number, or physical address wherein they can be contacted. An apparatus 100 may also include an identifying key or code for the apparatus imprinted therein. This specific key code may operate in a manner such as a bar code, serial number, or QR code. This key code may be an identifying mark registered with the US post office, Federal Express, UPS or any other common shipping carrier. The instructional portion 106 may also simply instruct a finder to place the apparatus in the nearest mailbox. The key code may provide instructions to the shipping carrier regarding the proper address for delivery, ensuring that the owner receives the missing apparatus and any other attached object thereto.

In some embodiments of the apparatus 100, the apparatus may be configured to alert emergency services such as fire departments, ambulances, police, campus security, poison control or other third parties registered and stored in the data storage memory 110 of the apparatus 100. Other third parties may include a designated contact person, friends, family, relative, co-worker, physician or any other individual who may associate or know the user of the apparatus. The information stored within the data storage 110 of the device 100, may be organized in any readily accessible manner known in the art, including as database, dataset, information repository, knowledge base, data mart or data warehouse. The information being written and placed in the data storage 110 may be provided to the apparatus from many different data sources. The Apparatus may equipped with software, software modules, programs, applications, firmware or code that instructs the apparatus 100 how to organize, the data stored in the data storage 110 of the apparatus. The apparatus may automatically organize this information into the more readily accessible format, or a computing device loaded with a program, software, software module, or application may organize the information. This organizational step performed by a computing device may be performed remotely through a network or transmitting device such as those described above, or the organization may occur when the apparatus is plugged directly into a mating port of the computing device such as a USB port.

The apparatus 100 may be capable of storing a plurality of third parties contacts in the data storage memory 110 of the apparatus 100. In some embodiments, the user may be able to specifically select or designate which type of assistance may be needed and who to contact under the specific current conditions occurring at the time assistance is needed. A user of the apparatus may select to appropriate third party contact using an onboard input device such as a keypad, keyboard, scroll wheel, buttons, switches, dials or one or more sensors. In other embodiments, the apparatus may be pre-programmed for contacting specific individuals based on the use of the apparatus. The apparatus may be programmed to dial a specific third party based on the button pressed, the number of times a button is pressed, a numerical identifier associated with the third party. For example, holding down a button for 3 seconds may contact the police whereas three successive presses of a button within a designated time frame may contact the fire department. The input device when activated, may be able to simultaneously or nearly simultaneously transmit via the wireless transmitter a request for assistance, information stored in the data storage device and/or open a direct line of communication with the recipient of the request for assistance, including voice, video or text based communication. In some embodiments the activation of the input device, may be performed using a single input into the input device, for example, a single press of a button, a holding a single button for a specified period of time or performing any other single action with the input device.

The third party contacted by the apparatus may vary depending on the nature of the assistance required. For example if the person is threatened on a college campus, the apparatus may be instructed to contact campus police as the third party. In another instance, there may be a fire and thus the apparatus may request that the local fire department dispatch fire personnel to the location at or near the location of the apparatus 100. In other instances there may be health related issues or emergencies that would necessitate that an ambulance or poison control may be necessary.

In other embodiments, the apparatus 100 may include only a general request for assistance, to a specified call center or local 911 dispatcher who may subsequently identify the circumstances of the situation and relay the information sent by the apparatus to the appropriate third party. Embodiments of the apparatus may identify the appropriate call center or dispatcher based on the location information or GPS information stored of the apparatus.

In the event of an emergency or an event requiring assistance, an individual user may readily request assistance from emergency services or other third parties registered on the apparatus 100 by activating the personal monitoring apparatus. The apparatus 100 may be designed in some embodiments to be simplistic and easy to use so that when a situation arises. An individual may easily request assistance as quickly and effortlessly as possible. In some embodiments, the personal monitoring apparatus 100 may engage a sequence of steps requesting assistance through manual activation by the user. For example, in the exemplary embodiment of the apparatus 100, the monitoring apparatus may be equipped with a button 101, switch, slider or other mechanism controlled by the user, which may send a signal to the device to request assistance. Upon activating the button, switch, slider or other activation mechanism, a request for assistance may be broadcasted to a third party wherein said broadcasted request may include information such as GPS location, user identifying information, environmental information or conditions and further details about the nature of the request and the type of assistance needed.

In alternative embodiments, the apparatus 100 may be equipped with one or more sensors 103. The one or more sensors 103 may be used to automatically track and monitor various user based variables or environmental conditions surrounding the apparatus. For example, in some embodiments, the sensors 103 may be equipped to monitor and track medical or health related variables of the user such as heart rate, blood sugar levels (for example, if the user is diabetic), pulse rate, breathing rate, body temperature, or any other medically measurable variables.

In the event that a monitored variable increases or decreases above a certain level, the sudden change in the monitored variable may indicate an event that requires assistance such as emergency medical assistance. For example, if heart rate is being monitored by a sensor 103 and the monitored heart rate spikes unexpectedly to a predetermined level, such as 200 bpm, this may indicate that there may be a blockage or embolism causing the heart to work harder than normal, which may ultimately lead to a heart attack. Accordingly, in response to the observed symptoms measured by the monitoring apparatus 100, the apparatus may automatically initiate contact with services that may be capable of assisting with the associated medical condition. Such services may include contact an ambulance, the user's primary care physician and/or a local hospital.

In another example, the monitoring device may be monitoring the user's body temperature. The user's body temperature may begin to increase or decrease to a level that may not be considered normal. For instance, the body temperature may rise over normal human body temperature of 98.6° F. This may indicate the individual is suffering from a fever or other condition that may require medical attention. The apparatus may be programmed to respond to a spike in body temperature by contacting the user's physician who may have contact information registered and stored in the memory of the apparatus 100. In another example, the body temperature sensor may detect an unsafe drop in body temperature. This may indicative of hypothermia. Accordingly, the apparatus 100 may automatically contact a third party to request assistance, such as the fire department or an ambulance.

In alternative embodiments, a plurality of sensors 103 may be capable of measuring the environment around the user and activating a request for assistance based on the sudden measurable change in the environment surrounding the user. Environmental factors such as ambient temperature, acceleration, velocity, and even a predetermined list of key words or sounds may provide clues regarding the need for emergency assistance, In view of these environmental factors, key words, and sounds, the apparatus may activate a request for assistance from a third party. For example, embodiments of the sensor 103 may measure the surrounding ambient temperature of the user. In the event of a fire, the user may be either unconscious due to smoke inhalation or sleeping and therefore unable to engage the request for fire services by manually pressing the button or switch 101. The sensor 103 may detect a sudden extreme increase in temperature surrounding the device and automatically alert fire services that a hazardous heat based condition may exist such as a fire. The apparatus may further assist the fire services by providing location information and identifying information about the user so that the user may be found and identified by the fire department quickly.

In another embodiment, wherein the monitoring apparatus 100 includes one or more sensors 103, the monitoring apparatus may record and track the velocity or acceleration of the user using a built in accelerometer or an accelerometer in communication with the apparatus. The velocity or acceleration may be indicative of the user's mode of transportation, such as being in a vehicle, on a bicycle or just walking on foot. However, sudden spikes in acceleration or a sudden decrease in velocity, beyond the rate of a standard braking system, may be indicative of a collision between vehicles or the user being struck by a vehicle. Accordingly, in response to a sudden change in acceleration or velocity, the apparatus 100 may automatically engage services or assistance to respond to the user's current location, or the device may open a dialogue with the user to inquire whether the user is unharmed or in need of assistance.

Figure 2:
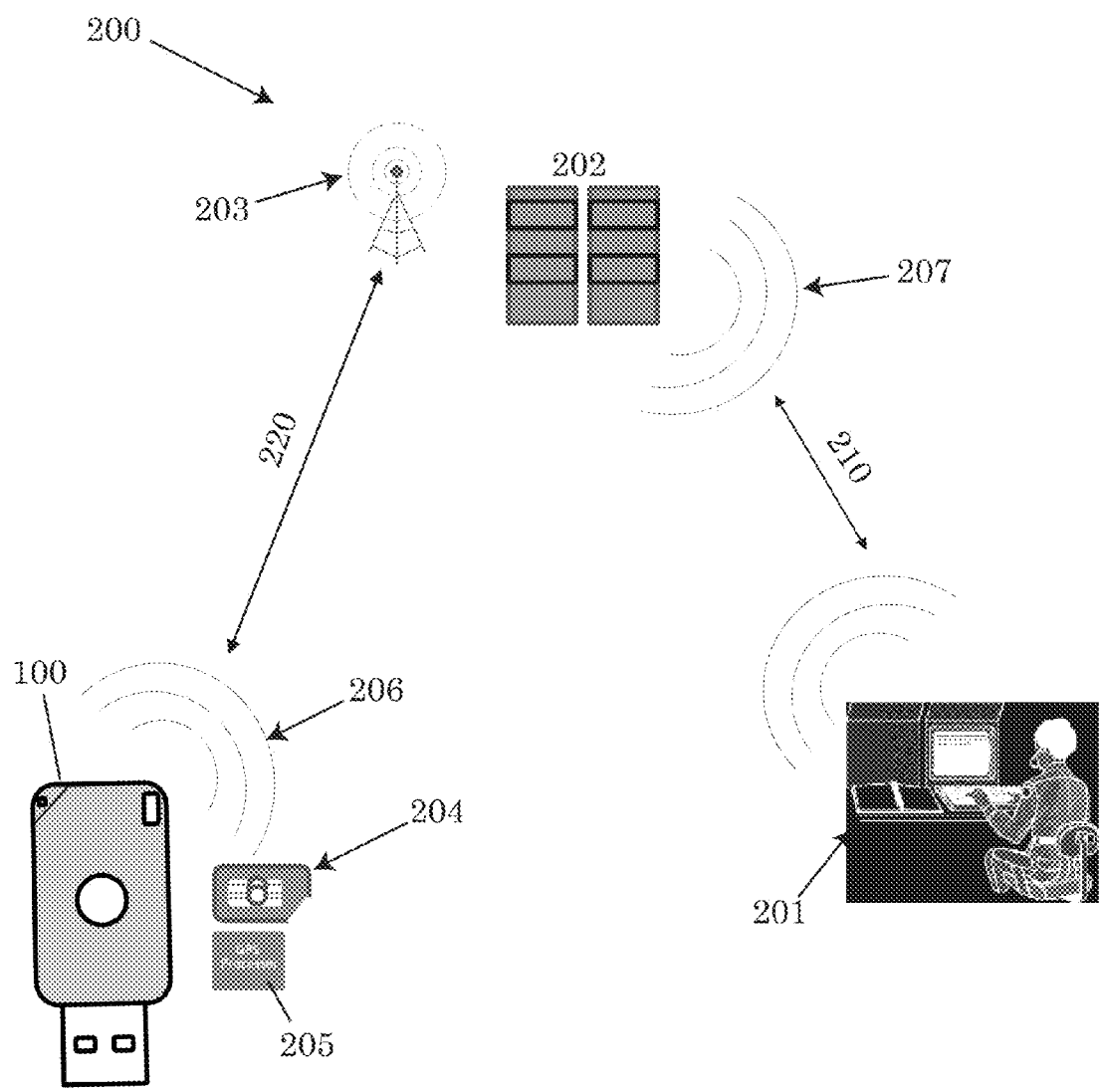
FIG. 2 depicts an embodiment of a personal monitoring apparatus requesting assistance.

Referring to the drawings, FIG. 2 depicts one embodiment 200 and method for utilizing the monitoring apparatus 100. In the depicted embodiment, the monitoring apparatus 100 may be equipped with a SIM card 204, allowing the apparatus 100 to directly access a cellular tower of a cellular network 203 and interface directly with network servers 202. By accessing the cellular network 203 and the server 202, the apparatus 100 may transmit and receive requests from the apparatus 100 to a third party 201 network enabled computing device. The transmitted request 220 may be submitted to the server 202 in any format the server 202 may understand. For example, the requesting device may submit the request via a webs service to a server. Such web services may include HTTP, HTTPS, SMTP, FTP, Blocks Extensible Exchange Protocol (BEEP) Representational State Transfer (REST), XML messaging protocols such as XML-RPC (remote procedure call), WS-Addressing (web services addressing), simple object access protocol (SOAP), web services description language (WSDL), Universal Description Discovery and Integration (UDDI) or combinations thereof.

In the exemplary embodiment depicted, the personal monitoring apparatus 100, may contact a third party 201 network enabled device, such as a dispatcher for emergency service by directly requesting the assistance of the third party 201 through the server 202 once the apparatus has achieved a network connection with a cellular network 203 and activates the request an authorized request to the network 203. The apparatus may be activated, for example, by the user engaging device, such as by a push button 101, or automatically by one or more sensors 103 detecting that assistance may be needed. Upon being activated, the apparatus 100 may transmit 206 a cellular or wireless signal 220 to a network server 202, via the cellular network 203. Information included in the signal 220 may include personal information about the user stored in the apparatus 100, location information obtained from the GPS processor 205, SIM card validation or encryption keys that may allow access to the network 203, and voice or video data from the user which may be describing the current situation and details describing why the assistance may be needed and/or any information obtained by the sensors 103 that may be useful to the recipient third party of the request. The communicating network 203 may send the message via any mobile communications network the SIM card may be identifiable on. Communications networks 203, which may be used to communicate, may include GSM, GPRS and SMS communication networks or any of the other networks described above or known in the art.

The requests made to the server by the device 100 may then further be broadcasted 207 to the third party 201 via a second signal 210. Upon receiving the request for assistance, the third party 201, which may be an operator, emergency services dispatcher or general call center recipient, may view the information sent by the apparatus. The third party may proceed to open a line of direct communication with the apparatus 100 and communicate with the user directly in an effort to ascertain more information about the current situation. For example, in some embodiments of the apparatus, the apparatus may be equipped with an onboard microphone, on board video camera and/or an onboard speaker. This may allow the third party to speak directly with the apparatus's user or view the user's surroundings first hand. In some embodiments, the apparatus 100 may record the conversation between the third party 201 and the user. The conversation may be stored in the storage device memory of the apparatus 100. A third party 201 may also use the apparatus's transmitted location data to find the closest video source, such as a CCTV camera that can be accessed, in order to identify additional details of the situation relating to the request for assistance. Accordingly, the third party may also use the location data of the apparatus to target a response and request that additional assistance be sent to the apparatus's location.

In some embodiments of the apparatus 100, the apparatus may not include each and every feature of the embodiments described. For example, in some embodiments, the apparatus 100 may not include such features as a GPS processor, SIM card, a camera, a microphone, or one or more speakers. Embodiments of the apparatus however may be tethered or connected to a computing device 301 and the apparatus may be able to co-opt and utilize the computing device's onboard functions instead of having them directly equipped on the apparatus 100 itself. Examples of a computing device 301 that may be electronically connected to or wirelessly tethered with the apparatus may include but are not limited to cellular phones, home computers, laptops, tablet computers, smart phones, video game systems, smart TVs, network enabled devices, iPads, and portable media devices. The network between the apparatus 100 and the computing device may be established wirelessly. The apparatus 100 may in some embodiments utilize an onboard transmitter or transceiver such as Bluetooth, Wi-Fi, Bluetooth low energy (BLE), RFID, CDMA, GSM, infrared (IR), broadcast radio, microwave transmission, satellite communications or any other known type of wireless signal capable of transmitting a signal to establish a network connection with the computing device 301. The connection may be established using any network protocol known, including Bluetooth protocols, fibre channel network protocols, open system interconnection protocols (OSI), routing protocols, IPV4, IPV6, realtime publish subscribe protocol (RTPS), secure shell (SSH), simple mail transfer protocol (SMTP), hypertext transfer protocol (HTTP), secure HTTP (HTPPS), file transfer protocol (FTP), secure FTP (SFTP), secure socket layer (SSL), point to point protocol (PPP), internet message access protocol (IMAP) transmission control protocol (TCP), and internet protocol (IP) suite (TCP/IP of TCP/IP stack).

Once a network has been established between the personal monitoring apparatus 100 and the computing device 301, the apparatus may co-opt and use the hardware or software associated with the computing device 301 to send and receive information in a manner as if the additional hardware or software components of the computing device 301 were built into the apparatus 100 itself. For example, the apparatus may take advantage of the personal computing device's onboard GPS processor, microphone, SIM card, camera, speakers, keyboard or keypad, screen, touchscreen, I/O devices, storage device, memory, operating system (OS), network car, Wi-Fi antenna, CPU processing power and any other features of the computing device known to those in the art.

In some embodiments, the computing device 301 may have an application or program loaded into the memory of the computing device that may allow the user to regulate, control and determine which features and settings of the computing device 301 may be controlled by the apparatus 100. The user of the apparatus 100 and the computing device 301 may set permissions for the apparatus 100, allowing one or more designated components of the computing device to be co-opted by the apparatus. In some embodiments, the application or program may be a standalone program or program module having its own graphical user interface (GUI) or dashboard. In other embodiments, the application or program installed onto the computing device 301 may be an application programming interface (API) loaded into the memory or storage device of the computing device 301. The API may contain instructions and programming code directing an existing piece of software or hardware how to interact and respond to communications sent to the device by the apparatus 100.

In some embodiments, apparatus 100 or the computing device 301 wirelessly tethered to the apparatus 100, may be customized with one or more API's of third party products. The API's may contain programming code instructing the apparatus or the computing device how to interact and utilize the features of the third party product. For example, currently on the market there are companies that produce various sensor related fitness bands and health peripherals. The apparatus 100 or the computing device 301 may be loaded an API that can integrate the features of the third party peripherals into the apparatus 100. Using a fitness band as an example, companies such as Jawbone® and Fitbit® have wearable bracelets that monitor various conditions of human health and fitness. The parameters of the fitness band may be used as the sensors 103, in addition to, or in lieu of the onboard sensor of the apparatus 101. The apparatus 101 may integrate and receive data from the third party sensors as if they were onboard sensors integrated into the apparatus. In some embodiments, the API may facilitate instructions for sharing data and directing the communication between servers or network devices that communicate with the apparatus 100 and the third party product. The third party product may share information to a host network, over a network connection, such as through a computing device and/or networking software and programs, including servers, cloud networks and other networked devices, either real or virtual. Information generated by the third party product may be communicated to the host network instructed via the API. The information submitted to the host network may subsequently be forwarded to the apparatus or a computing device connected to the apparatus. In some embodiments, the exchange of information and data between the hosting network or networked devices may be secured by network requesting login information, authentication or credentials before the third party product may access the devices that are part of the host network. A third party device may be granted authentication and credentials for accessing the host network that manages and communicates with apparatus 100 by registering the third party product with the network, or by having the user of the device tie the third party product to a new or existing username and password. Once authenticated and logged in to the network, the third part product may share gathered data and information collected by the third party product with the host network and the apparatus 100 through the network connection (i.e. the server).

Furthermore, in some embodiments, the apparatus 100 may be able to identify and customize the identification of information or other data sources sent to the third party 201. The identification of a data source may be presented to a third party 201 using designated icons or markers which provide a source identifier that the third party may recognize. For example, the apparatus may identify in the information submitted to the dispatcher that the heart rate figures are obtained from a "Polar H6 Heart Rate Sensor" versus heart rate figures received from an integrated Fitbit® wrist band.

Figure 3:
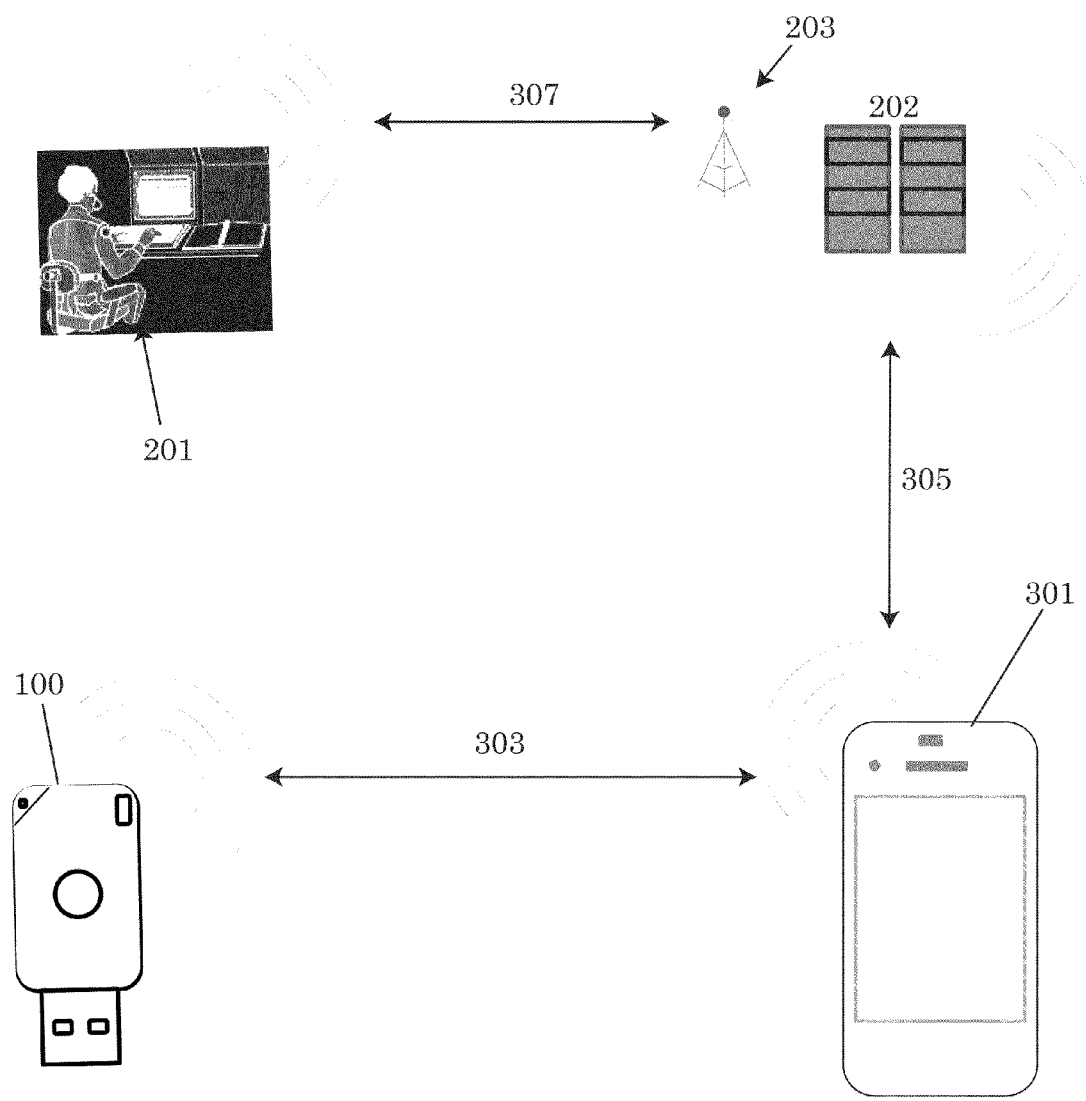
FIG. 3 depicts an alternate embodiment of a personal monitoring apparatus requesting assistance via a tethered computing device.

In the exemplary embodiment depicted in FIG. 3, a personal monitoring apparatus may be wirelessly tethered to a computing device 301 via a wireless transmitting device establishing a wireless connection 303 using a wireless signal such as a Bluetooth, BLE, RFID, CDMA, GSM, infrared, broadcast radio, microwave transmission satellite communications or any other wireless signal capable of establishing a wireless connection between the apparatus 100 and the tethered device 301. In the event that the apparatus 100 is activated automatically via sensor 103 or manually by the user, the apparatus 100 may take advantage of the tethered computing device's 301 onboard SIM card, memory, GPS or other hardware, software, programs, program modules, applications or networked resources or network connections to send a request 305 to a server 202 directing the server 202 to contact a third party 201. Similar to the previous embodiments depicted in FIG. 2, the embodiment of the apparatus 100 shown in FIG. 3 may also transmit any of the information previously described above that may be stored in the storage device of the apparatus or the computing device 301, including for example location information, personal information, voice data, and/or video data to the third party.

The request sent to server 202 may be transmitted via a network such as a cellular network 203 or other communications network via a signal 307 to the third party 201. Upon receiving the communication from the computing device 301, which was initiated by the apparatus, the third party may open a direct line of communication with either the computing device or the apparatus, including voice, text or video communication.

The procedure for sending communications back and forth between the third party, apparatus and/or tethered computing device 301 may vary depending on the components equipped on the apparatus and the computing device. For example, if the apparatus has an onboard microphone and speakers, the apparatus may act as a pseudo headset for the computing device 301, allowing the user to speak into apparatus and receive auditory communications of the third party, without having to use the computing device directly. This embodiment may be advantageous because it may allow for sending communications between the apparatus and the third party while still being able to keep the computing device closed or in the pocket of the user. As the user speaks into microphone and listens to the speakers of the apparatus, the computing device in the user's pocket is able to receive the information from the apparatus and transmit the information to the third party 201. However, in another example, wherein the apparatus 100 lacks a video camera and the third party attempts to view video of the surroundings or user, the user may have to directly engage the tethered computing device's onboard camera to allow the third party to receive a video feed.

In some instances, it may not be possible for the user of an apparatus 100 to send a signal to a third party 201 with the user's own apparatus or apparatus tethered to a computing device 301. However, a situation may arise in circumstances where the user's apparatus and/or tethered computing device is unable to connect to a communications network without engaging additional hardware or increasing the range of the apparatus or tethered computing device 301 in order to locate the communications network. Examples where an apparatus 101 may be unable to contact a third party 201 without additional hardware or components may occur when a SIM enabled apparatus is out of range of a communication network, the apparatus 100 is unable to tether to a computing device (e.g. device 301 does not have any more power, is out of range, or lacks permissions or software to communicate with the apparatus 100), or the tethered computing device is outside of a network. Under such circumstances where the apparatus us unable to contact the third party 201 on its own or via a tethered computing device 301, the apparatus may search for a second personal security and monitoring apparatus 401. Embodiments of the first 100 and second apparatus 401 may communicate via the onboard wireless transmitters, transceiver or via a wireless transmitter or transceiver on a co-opted device 301 being used by the first apparatus 100. In the Exemplary embodiment, the connection 403 between the first 100 and second apparatus 401 may be facilitated by a Bluetooth, Bluetooth LE, Wi-Fi connection, RFID, CDMA, GSM, infrared (IR), broadcast radio, microwave transmission, satellite communications. Once a connection has been established between the first 100 and second 401 apparatuses, the first apparatus may direct the second apparatus to contact the third party 201 on its behalf.

Figure 4:
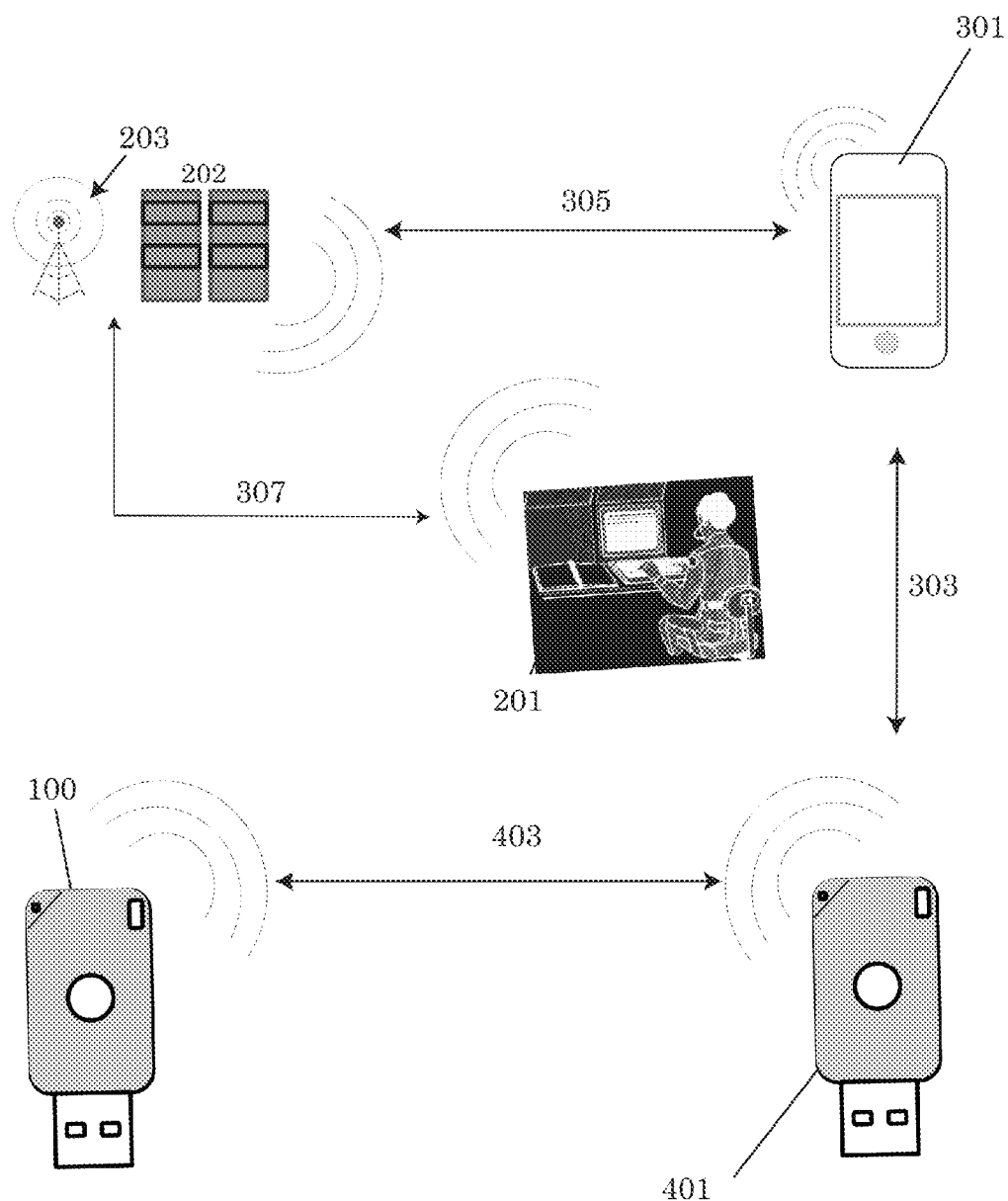
FIG. 4 depicts an embodiment of a personal monitoring apparatus requesting assistance via communication with a second personal monitoring apparatus.

In the embodiments wherein a second apparatus 401 is forwarding signals from the first apparatus 100, the second apparatus may operate in a similar manner to the embodiments described above. For example, the second apparatus may be equipped with a SIM card and GPS locator or any combination of features previously described. The SIM enabled second apparatus may directly communicate with server 202 via the network 203 and facilitate a request for assistance directly to the third party 201. In an alternative embodiment, such as the embodiment depicted in FIG. 4, the second apparatus 401 may be wirelessly tethered to it's own computing device 301 which may be unassociated with a computing device that may be tethered to a first apparatus 100. Accordingly, similar to the method described previously, the second apparatus 401 may receive personal data, location data and/or any other information stored in the data storage of the first apparatus 100 which may be relayed to the third party 201.

Upon receipt of the request for assistance and the data from the first apparatus, the second apparatus 401 connected via network signal 405, may use the second computing device 301 to submit the location data, personal information and request of the first apparatus 100, for assistance, to the third party 201. Accordingly, the recipient third party, such as an emergency services dispatcher, may subsequently open a line of communication with the second computing device 301, second apparatus 401, first computing device 301 or the first apparatus 100.

Figure 5:
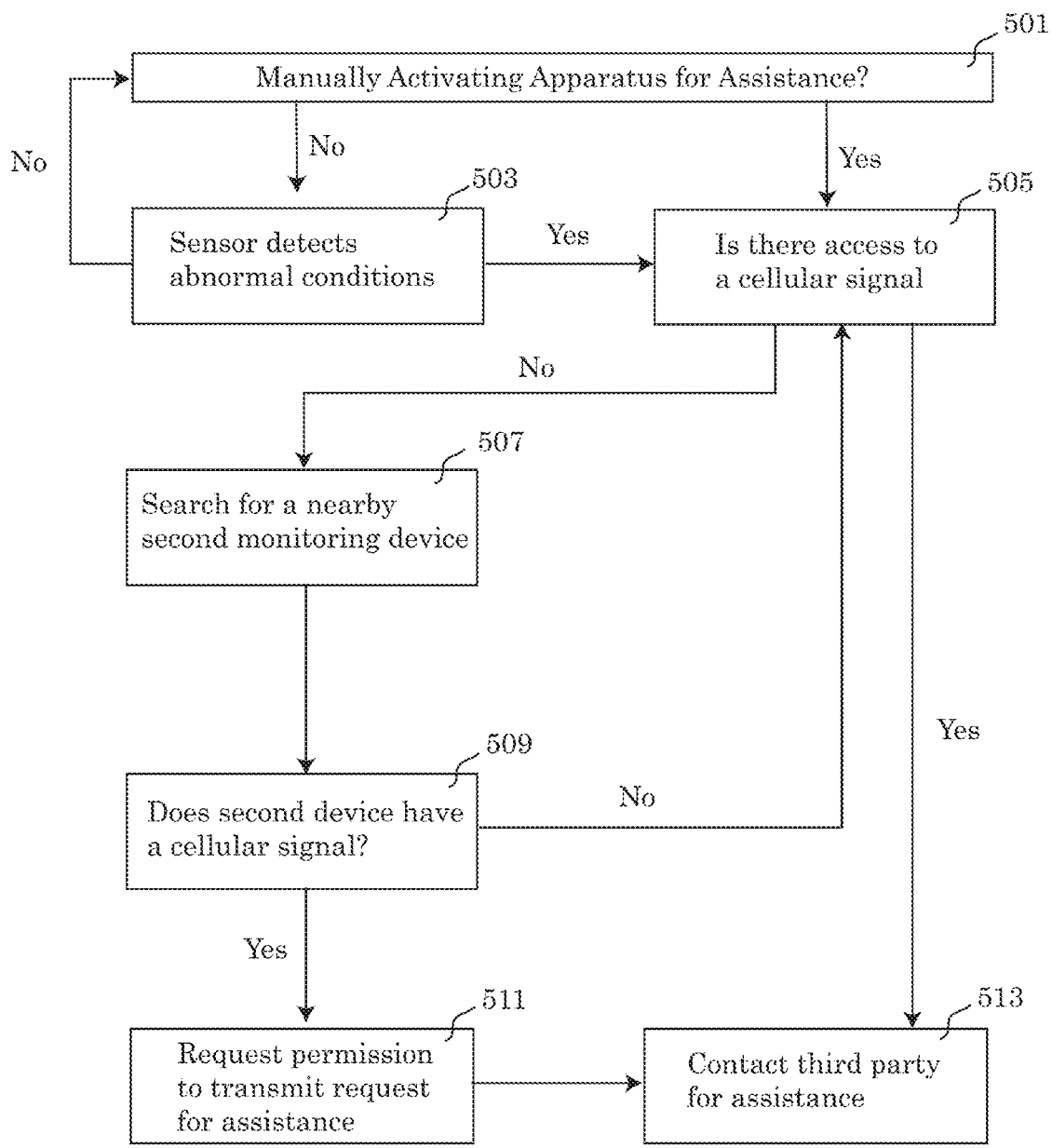
FIG. 5 depicts a schematic of a method for requesting assistance using a personal monitoring apparatus.

Referring to FIG. 5 which depicts a schematic of a method for activating and transmitting a request for assistance using an embodiment of a personal security alert and monitoring device 100. Embodiments of the method may include the steps of determining whether or not apparatus has been manually activated by the user 501. In the exemplary embodiment, the apparatus may engage in requesting emergency services or assistance by directly activating the button 101 on the apparatus itself. In the event that the apparatus has been manually activated by the user 501, apparatus 100 may subsequently determine whether or not assistance may be requested by the apparatus in its current state. This may include a step of evaluating the capabilities of the apparatus, including the step of determining whether there is access to a cellular signal 505 or other network capable of submitting the request for assistance to a third party. If a cellular signal or sufficient network is present 505, the apparatus may commence connecting to the network and submitting the request for emergency services 513 or other assistance via the network as described above and transmitting information stored in the data storage of the apparatus 100 to the third party 201.

In some embodiments, wherein a cellular network or signal is not directly available to the monitoring apparatus 100, the apparatus 100 may engage in a step of searching for and connecting to a second monitoring apparatus 507. The apparatus may engage in a step of determining whether or not the second monitoring device is capable of sending the request for assistance or emergency service using a cellular or other communication network. If the second monitoring device is capable of forwarding the request, the first apparatus may request permission to send to transmit the request and stored information via the second apparatus. The second monitoring apparatus may perform the step of forwarding the first apparatus's request for assistance, to the desired third party. If however, the second apparatus does not have access to a network capable of transmitting the request to a third party, the first apparatus 100 may proceed by continuing to search for a separate device capable of fulfilling the request. In some embodiments, the first apparatus may also remain connected to the second apparatus and use the second apparatus to extend the searching range in order to find a third monitoring device within a search radius of the second monitoring device's radio transmitter, that is able to transmit the request to a third party via a communications network. In some embodiments, the chain of personal apparatuses may be more than a first 100 and second apparatus. Embodiments may include a daisy chain of two or more apparatuses connecting to one another via radio transmitters one each device in the daisy chain. For example, a daisy chain of 3-50 apparatuses may be wirelessly connected. The chain may continue to grow in the number of devices connected, until an apparatus at the end of the chain is identified as being capable of transmitting a request via a communication network to the requested third party 201.

In an alternative embodiment of the method for requesting assistance, the step of manually activating the apparatus may not occur. For example, the apparatus may not include a button, switch or other means for activating the apparatus manually, or the user may not have engaged in the step of activating the apparatus. In this alternative embodiment, the apparatus may engage in the activation step based on information collected by sensors detecting abnormal conditions 503 or parameters of the user and the user's surroundings. Based on the information collected by the sensors of the security apparatus, the apparatus may automatically elicit a request for assistance, for example, when the conditions of the user's health related variables or the user's environmental conditions are calculated by the apparatus to be outside a pre-programmed value or range of values.

Figure 6:
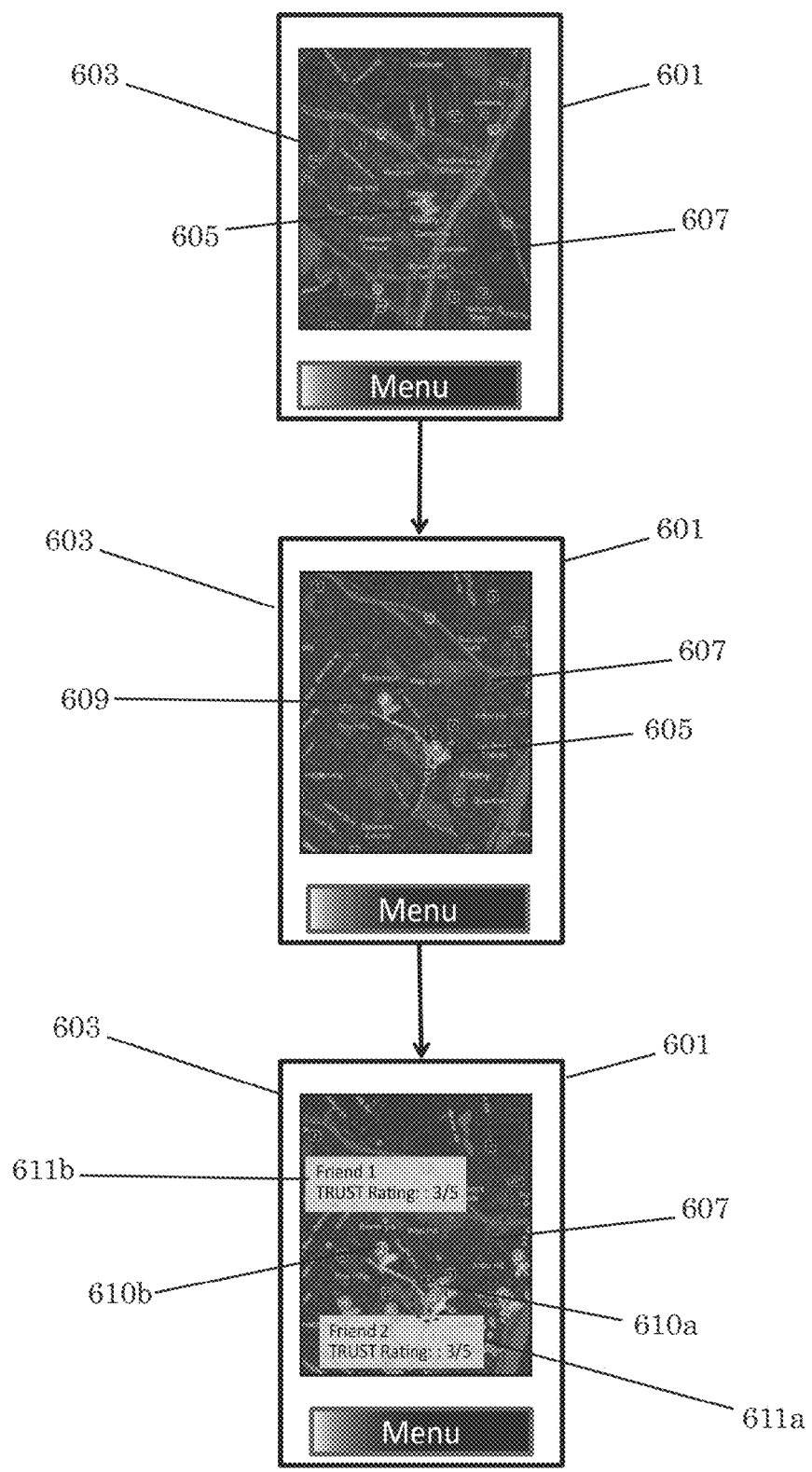
FIG. 6 depicts an embodiment of a user interface for tracking and determining the position of a personal monitoring apparatus.
Figure 7:
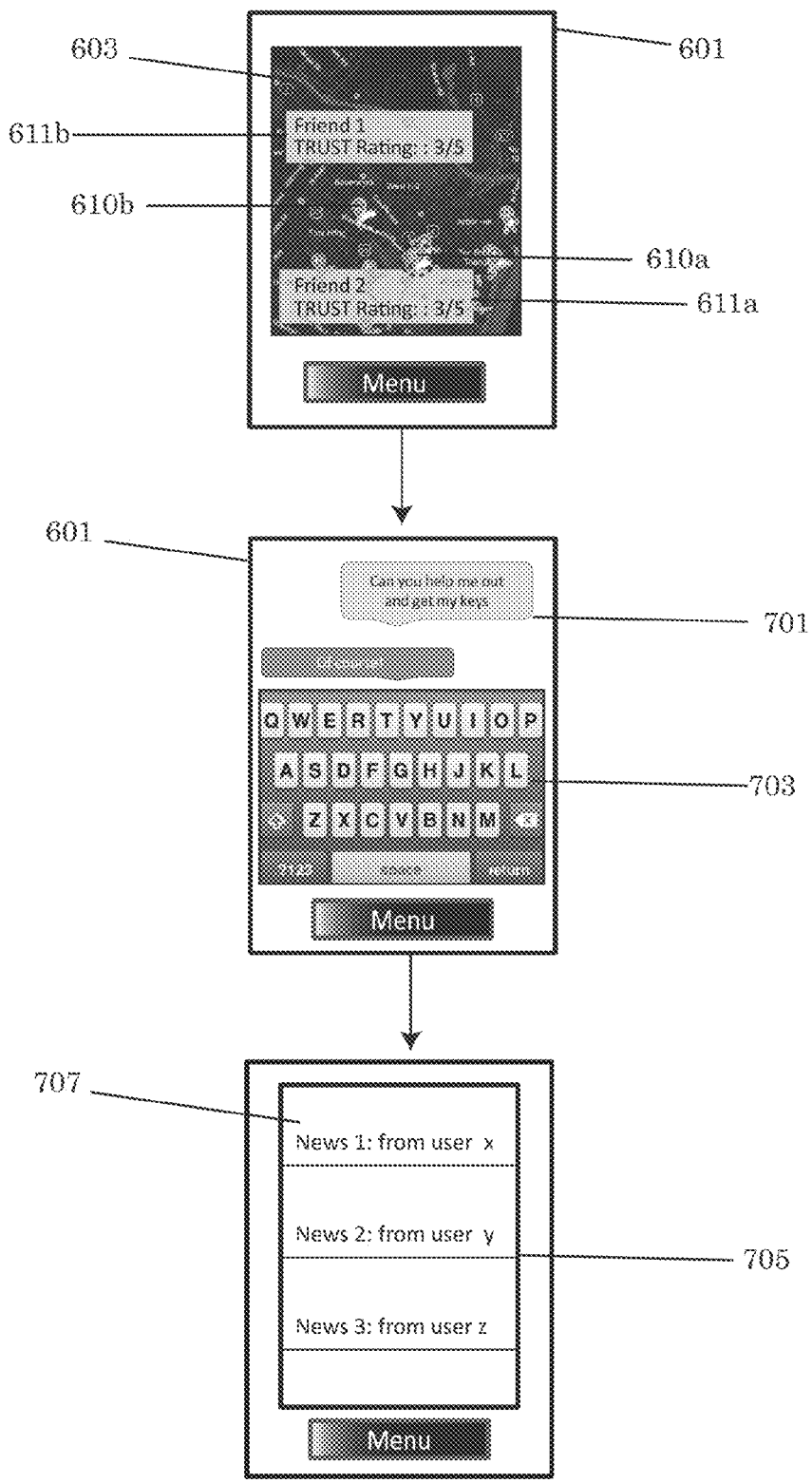
FIG. 7 depicts an alternative embodiment of a user interface having a message board and onboard communication services capable of contacting users of other personal monitoring apparatuses.

In some embodiments, the apparatus 100 may further be capable of having its position identified, located or tracked by a computing device, networked device or system. FIG. 6 depicts a user interface of a computing device tracking and determining the location of the apparatus 100. The user interface may be an application, program, program module, loaded in the memory of the device tracking the apparatus's 100 location. The tracking device 601 may be any computing device having memory and a processor capable of loading and running the application which communicates with the apparatus 100. Examples of a tracking device may include a personal computer, laptop, tablet PC, iPad, Apple® watch, Pebble®, mobile phone, smartphone, and network enabled media player such as an IPod. The tracking device's interface 603 or dashboard may include a display portion. The display portion may include or display information regarding the location of the apparatus 605, the apparatus's user identification information and/or an interactive map 607. In one embodiment, the location of the apparatus may be displayed on a generated map allowing for easy visualization of the apparatus's location. In an alternative embodiment, the tracking device may provide an address, and/or step by step directions guiding the user of the tracking device from their current location to the apparatus's location. The display generating the map, may follow the users movements in real time 609 and update the map depending on the user's location in relation to the apparatus 100.

In an alternative embodiment, the program, program module, or application loaded into the tracking device may register the user of the loaded program as part of a social community with other individuals also having the program or application. The application interface may include a social network or community of active users 610a, 610b who each have the interface loaded on their own tracking devices. The display of the interface may also include identifiers of each user. The identifiers may include the participating members' name or user ID, location and a trust rating 611a, 611b which users of the interface may comment or leave feedback about other users. The trust rating may be helpful in assisting individuals of the interface to determine which people are helpful in retrieving lost apparatus's or who may reliably give permissions to a user's apparatus when requests are made to forward requests for assistance via a second apparatus 401. In some instances, a lost apparatus may be close to user who is a member of the social network community of the interface application. Instead of the user moving to the location of the lost apparatus 100, an individual user may contact a community member who is close by and ask them to retrieve a lost apparatus or to place the apparatus in the mail so that the USPS, UPS or other common carrier can deliver the lost apparatus back to the user. The trust rating may allow users to provide feedback about helpful and unhelpful users.

The user interface may further include a messaging service communication function 701 and input mechanisms 703 such as a virtual keyboard, for facilitating communication between users of the interface application. The messaging service may be a program, application or web service loaded into the data storage device (such as the memory) of the apparatus 100 or the computing device 301 being electronically paired with the apparatus 100. In one embodiment, an individual attempting to ask another to retrieve their apparatus 100 may simply click the user profile on the display and then type a message and submit it to the user directly in the application interface. Users may then communicate back and forth to discuss the logistics of locating and returning the apparatus 100.

Alternative embodiments may include other forms of communication between users of the application, such as a message board 705. The message board may facilitate postings 707 and responses between users of the application. The message board may be used to provide a mass request for assistance among the broad user base of the interface application rather than singling out and asking each individual user for a help. The message board may be useful for obtaining voluntary responses for help retrieving an apparatus.

The social community messaging service functionality, including the instant message features and message board do not necessarily need to be tied to the application for identifying the location of a lost apparatus. In some embodiments, the social community messaging program, application or web service may be separately loaded in the memory of the computing device 301 tethered to apparatus 100, or loaded directly into the memory of apparatus 100. Users having a computing device 301 or an apparatus 100 may communicate using the messaging service with other members of the messaging service's community of users.

Figure 8:
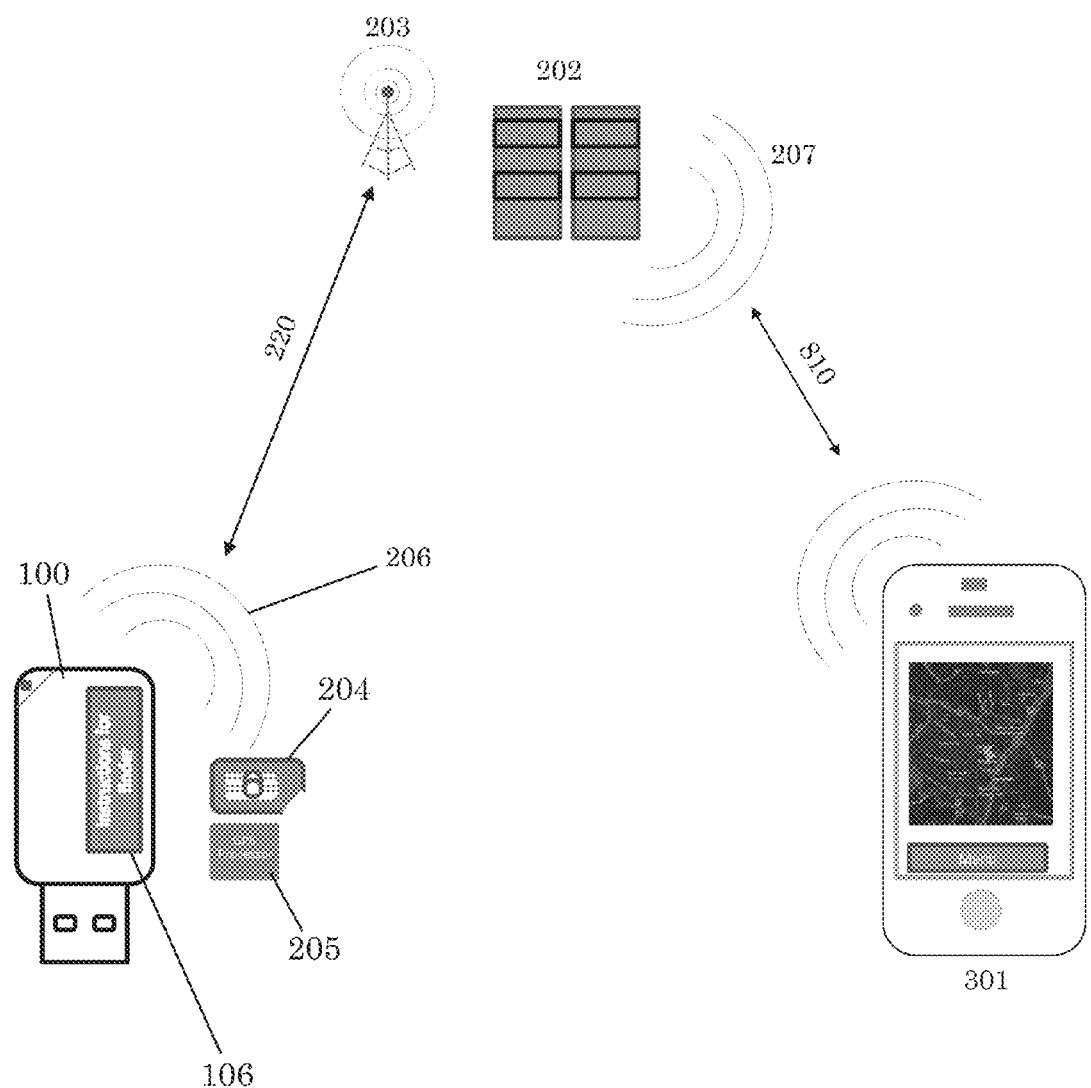
FIG. 8 depicts an embodiment of a method of relaying the position of a personal monitoring apparatus to a computing device capable of tracking and ascertaining the apparatus's location.

Referring to FIG. 8 which depicting an embodiment of a method for tracking and tracing an apparatus's position or location. The location may be tracked using GPS satellites 901 or network triangulation 903a, 903b, 903c techniques or a combination of methods thereof. One embodiment may include submitting a request 810 from a requesting computing device to a server 202. The request may originate from a requesting device having the location tracking software, program, program module, dashboard, application, and interface or web service loaded in the memory of the requesting device. The requesting computing device 301 may include any of computing devices previously mentioned including personal computers, laptops, tablet PCs, mobile phones, network enabled computers, mainframes, servers, and network enabled media players such as an IPod. The request may be submitted to the server 202 in any format the server may understand. For example, the requesting device 301 may submit the request via a webs service to a server 202 such web services may include HTTP, HTTPS, Representational State Transfer (REST) and XML or any other protocol described above or known in the art and combinations thereof.

Once a server 202 receives the request from the computing device 301, the server may prepare and send a message via a communications network or other established network. The request to the apparatus 100 by the computing device 301 may include a request for identifying information stored on the data storage device of the apparatus, including information for the SIM card that the server can use to communicate via a mobile network. The communicating network may send the message via any mobile communications network or other established network to the apparatus 101 and/or the SIM card 204. Communications networks, which may be used to communicate, may include GSM, GPRS, CDMA, TDMA, Mobitex, EDGE, high-speed circuit switched data (HSCSD), SMS, Universal Mobile Telecommunication System (UMTS), W-CDMA, LTE, or Flash-OFDM networks.

The apparatus 100 may receive the communication from the computing device 301 via network communication. The logic board within the apparatus may, upon the receipt of the message, query location information using a GPS processor within the apparatus 100 from GPS satellites. Upon retrieval of location information the Apparatus may submit a return communication to the server 202 using the SIM card 204 along a communication network such as GSM, GPRS, SMS, CDMA, WCDMA, LTE, EDGE, 3G, 4G or even using a radio wireless communication network or protocol such as Wi-Fi, Bluetooth, BLE, etc.

Once the server receives the communication from the SIM card, the server may transmit the location information to the requesting computing device 301. In one embodiment, the server may receive an SMS text message and display the SMS in an XML file which may be available via HTTPS. In an alternative embodiment, the server may send a notification the requesting device using the application's internal communication service and/or REST/HTTPS. Once the requesting device 301 receives the transmitted location information, the requesting device may display the location information on the user interface's display 603.

Figure 9:
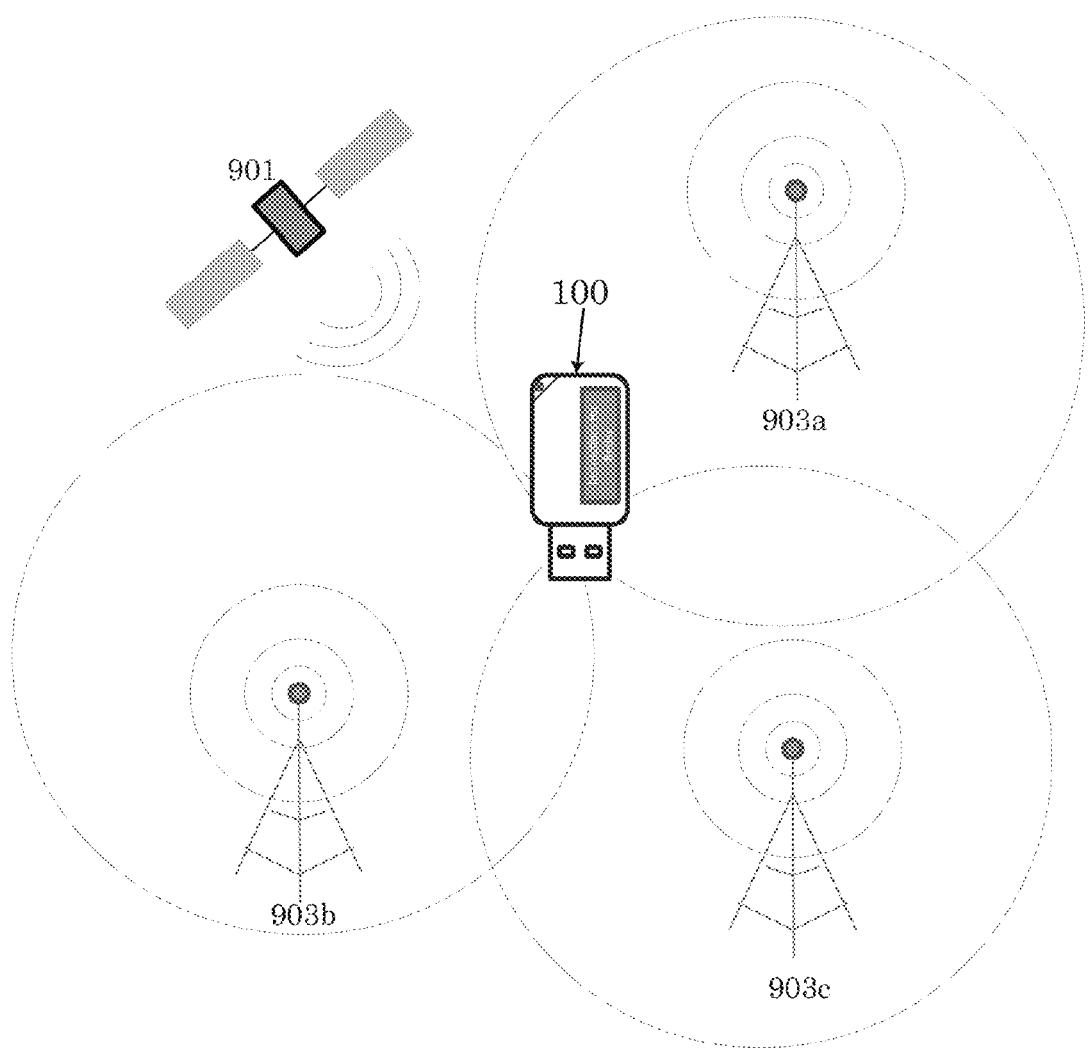
FIG. 9 depicts an embodiment of a method for triangulating the position of the apparatus via cellular network towers.

Referring to FIG. 9, which depicts a long range tracking method of an apparatus 100, one embodiment, includes an apparatus 100 which may be equipped with a GPS and/or an AGPS processor. The GPS processor and AGPS may enable the device to send and receive location information with the GPS satellite 901. Using GPS and AGPS positioning systems, the satellite 901 may transmit the positioning data to the apparatus 100. The apparatus may store the locational information within its data storage device 110. Upon receipt of a request by a requesting computing device 301, the apparatus may submit the GPS location data to the device 301 by the methods described above.

In an alternative embodiment, the traceable apparatus may be equipped with AGPS only. The mobile communications networks may use cell tower triangulation 903a, 903b, 903v to identify the position of the SIM Card embedded in the apparatus 100 or a device wirelessly tethered to the apparatus 100. As shown in FIG. 9, triangulation methods may include the use of at least one cell phone tower to locate the apparatus. To more accurately locate the position, at least three towers 903a, 903b, 903c may be employed. Each cell phone tower 903a, 903b, 903c may broadcast a signal on its mobile communications network in order to ping the SIM card of the apparatus 100. By using at least three cell phone towers a more accurate approximation of the apparatus's position can be made. The point where all three of the broadcasted signals intersect with the apparatus's SIM card 204, may indicate the position of the SIM card embedded within the traceable apparatus. In yet another alternative embodiment, a traceable apparatus may be located using a combination of both GPS location services and cell tower triangulation methods.

Figure 10A:
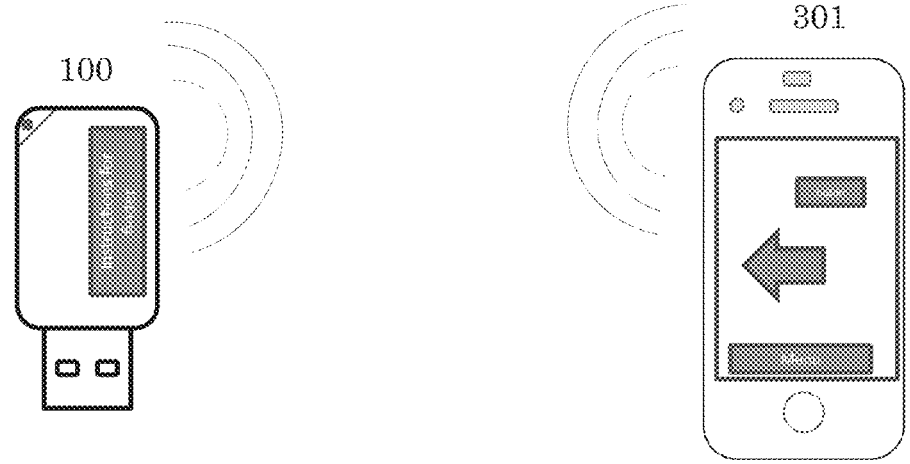
FIG. 10a depicts a short range method for tracking the position of personal monitoring apparatus using a wireless transmitter.
Figure 10B:
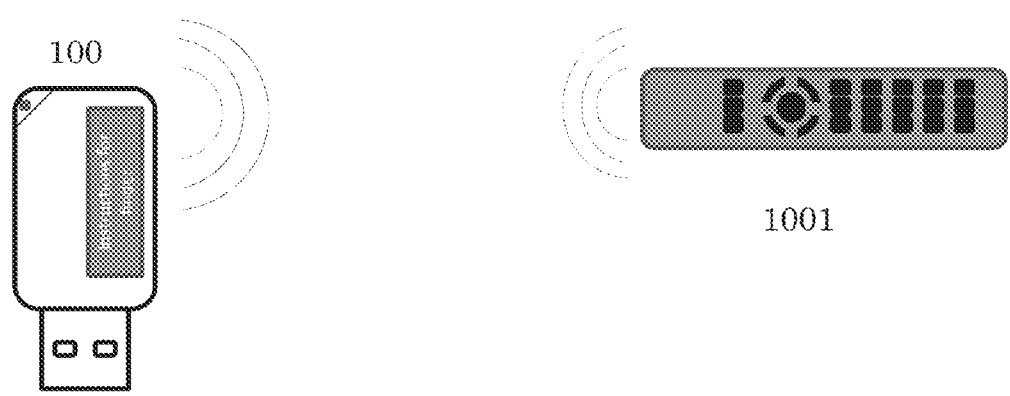
FIG. 10b depicts a short range method for tracking the position of a personal monitoring apparatus using a radio transmitter to activate onboard lights, sounds and other stimuli to alert the user to the position of the apparatus.

Referring to FIG. 10a depicting a method of short range tracking of an apparatus using a wireless transmitting device and/or protocol. As previously described, the apparatus 100 may be equipped with a Bluetooth, BLE, Wi-Fi or other enabled transmitting device capable of sending and receiving wireless signals. In one embodiment, a user may track the location of the apparatus using a computing device 301. The computing device 301 may be equipped with a wireless transmitter which may broadcast and ping a signal being emitted from the traceable apparatus 100. The computing device used to determine the location of the apparatus 100 may be equipped with applications, programs, program modules, web services, or software loaded in the memory of the computing device 301 which may display the current location of the apparatus 100. The application may also provide the user of the computing device with turn by turn directions and other information which may aid the user in discovering the apparatus's location. In an alternative embodiment, the computing device may communicate with the apparatus 100 via Bluetooth, BLE or other wireless transmission device and/or protocol to remotely enable one or more various output signals to be emitted from the apparatus's output device. Output signals may include flashing lights, sounds, vibrations and combinations thereof. In addition, the application, program, program module or web service loaded in the memory of the computing device may provide a menu on its interface of selectable output signals a user may select to enable directly from their device. The requesting device may be able to adjust the volume and intensity of the output signals in order to aid their search of the apparatus 100 right from the interface or dashboard menu.

In an alternative embodiment, the apparatus may be equipped with a wireless transmitter such as a radio transmitter or infrared transmitter (IR) which may broadcast and receive radio signals from a searching device 1001. A searching device 1001 may be any device capable of sending and receiving radio frequencies to and from the apparatus 100. A searching device may include remote control devices, personal computers, tablets, laptops, and mobile media players such as iPods. The searching device may communicate with the apparatus 100 via radio frequencies and enable various output signals to be displayed from the apparatus's output device. Output signals may include flashing lights, sounds, vibrations and combinations thereof. In addition, the searching device may include buttons which may select the type of output signals released from the apparatus. The searching device may be able to adjust the volume and intensity of the output signals in order to aid their search of the apparatus.

The apparatus 100, its features and methods of use, may further be used in some embodiments as device a capable of receiving and relaying to other apparatuses, a mass alert or message. For example, in one embodiment, an emergency message or mass alert may be transmitted from a central location, such as a call center, dispatcher, 911, police station/police officer to one or more apparatuses 100 or network of apparatuses within a specified location or network. Each apparatus may receive an audio, visual or text alert including the mass alert transmitted by the central location.

The mass alert may be stored in the storage device apparatus of a receiving apparatus, however, under some circumstances, it may be expected that not all apparatuses that are intended to receive the mass alert will actually receive the transmission. This failure may be due to the inability of one or more apparatuses to be connected to a network in communication with the central location transmitting the message. For example, a user may have an embodiment of an apparatus that does not have a SIM card or is unable to wirelessly tether to a computing device at the time the mass alert is transmitted. A first apparatus receiving the mass alert may subsequently retransmit the information to a second apparatus, or rebroadcast it to all nearby apparatuses, automatically or manually selecting to rebroadcast via the input device of the apparatus. Instead of missing out on the mass alert, one or more nearby apparatuses or devices wirelessly tethered to the apparatus may rebroadcast the mass alert to other apparatuses using a wireless transmission device and protocol. For example, the mass alert message may be rebroadcasted to apparatuses using Bluetooth or BLE transmission methods to send the message to another device within the Bluetooth or BLE transmission area. Accordingly, any apparatus that is within the rebroadcast radius may be sent and receive the message from the one or more apparatuses rebroadcasting it.

This type of system may be useful during emergencies where a mass alert may be needed but individuals may be out of contact with their computing devices or have limited network capabilities. For example, schools and college campuses may have rules restricting internet access, cell phone use or computing devices during classes or other school activities. However, one or more students may have an active computing device on silent or the professor may keep a computing device on his person during class. In the event of a school emergency such as a fire or gun men in the vicinity of the school or campus, the students and teachers currently in class may receive a detailed message alerting them to the situation, even if only one individual out of a plurality of individuals is able to receive the mass alert. A single apparatus or wirelessly tethered apparatus having the capability to receive the mass alert may propagate the mass alert to other surrounding classmates and teachers within their rebroadcast radius.

While this invention has been described in conjunction with the specific embodiments outlined above, it is evident that many alternatives, modifications and variations will be apparent to those skilled in the art. Accordingly, exemplary embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

We claim:

1. A personal monitoring apparatus comprising:
   a data storage device with user identification information, a telephone number and a log file stored thereon, said data storage device configured to communicate the user identification information and the log file from the data storage device to a server of a cloud network;
   a wireless transmitter connected to the data storage device, the wireless transmitter configured to establish a wireless tether between the personal monitoring apparatus and a computing device connected to the server; and an input device affixed to the personal monitoring apparatus, said input device having a single input mechanism to direct the computing device via the wireless transmitter, to submit a web service request to the server, wherein said web service request is configured to simultaneously or near simultaneously, transmit the user identification information stored on the data storage device to a third party and transmit location information from a GPS processor of the computing device to the third party;
   and the input device is further configured to select the telephone number stored on the data storage device based on the location information of the GPS processor and direct the computing device to open a line of voice or text communication between the personal monitoring apparatus tethered to the computing device and the third party, wherein the data storage device is a universal serial bus (USB) flash drive.

2. The apparatus of claim 1, wherein the wireless transmitter is a Bluetooth, or Bluetooth low energy (BLE) transmitter.

3. The apparatus of claim 1 further comprising one or more sensors configured to automatically track and monitor a health related variable of a user or movement data.

4. The apparatus of claim 3, wherein the computing device is directed to submit the web service request in response to a change in the health related variable or the movement data.

5. The apparatus of claim 1, wherein the apparatus further includes one or more application programming interface (API) to integrate a feature of a third party product.

6. The apparatus of claim 1, wherein the single input mechanism selects the third party by the number of successive times the single input is pressed or the length of time the single input is pressed.

7. The apparatus of claim 1, wherein the data storage device of the apparatus further stores GPS location information received from the GPS processor of the computing device.

8. The personal monitoring apparatus of claim 1, further comprising a messaging service loaded into the data storage device.

9. A method for using the personal monitoring apparatus of claim 1, comprising the steps of:
   receiving via the wireless transmitter connected to the personal monitoring apparatus a mass alert from a third party or a second personal monitoring apparatuses, said wireless transmitter being a Bluetooth or Bluetooth low energy transmitter;
   storing the mass alert on the data storage device of the personal monitoring apparatus;
   automatically re-broadcasting via the wireless transmitter, the mass alert to one or more personal monitoring apparatuses within range of the wireless transmitter.

10. The apparatus of claim 1, further comprising a chain port attached to the personal monitoring apparatus, an identifying key or code imprinted on the personal monitoring apparatus and a low power state configured to reduce the amount of energy consumed by the personal monitoring apparatus.

11. The apparatus of claim 1, wherein the wireless transmitter is a Bluetooth or Bluetooth low energy transmitter configured to broadcast or ping the computing device with a location of the apparatus or position of the apparatus relative to computing device and display the current apparatus location or position relative to the computing device on a display of the computing device.

12. A method for using a personal monitoring apparatus comprising the steps of: storing user identification information, a telephone number and a log file on a data storage device of the personal monitoring apparatus, tethering the data storage device via a wireless transmitter to a computing device, said computing device connected to a server of a cloud network;
   activating the personal monitoring apparatus, via a single input of an input device connected to the personal monitoring apparatus, wherein the single input selects a third party and directs the computing device, via the wireless transmitter to submit a web service request to the server, wherein the server simultaneously transmits the user identification information stored on the data storage device to the third party and transmits location information from a GPS processor of the computing device to the third party;
   selecting, by the personal monitoring apparatus, the telephone number from the data storage device based on the location information of the GPS processor and directing the computing device via the wireless transmitter to open a line of voice or text communication between the personal monitoring apparatus tethered to the computing device and the telephone number of the third party, wherein the data storage device is a USB flash drive.

13. The method of claim 12, wherein the wireless transmitter is a Bluetooth, or Bluetooth low energy (BLE) transmitter.

14. The method of claim 12, wherein the step of activating, and opening the line of communication occurs automatically in response to one or more sensors tracking and monitoring a health related variable or movement data.

15. The method of claim 14, wherein the one or more sensors are a third party product sensor communicating with the personal monitoring apparatus via an application programming interface (API), network connection, server, cloud network or a combination thereof.

16. The method of claim 12, further comprising the step of connecting via the wireless transmitter, to a second personal monitoring apparatus, transmitting a request for assistance and the user identification information stored on the data storage device to the second personal monitoring apparatus.

17. The method of claim 16, further comprising the step of forwarding the request for assistance and the user identification information stored on the data storage device from the second personal monitoring apparatus to the third party.

18. The method of claim 12, further comprising the step of:
   loading into the data storage device a messaging service; and
   launching the messaging service.

19. A personal monitoring apparatus consisting of:
   a chain port;
   a logic board;
   a data storage device having a USB form factor powered by a USB rechargeable power source, wherein said data storage device consists of user identification information, a telephone number and a log file stored thereon, and the data storage device is configured to communicate the user identification information and the log file from the data storage device to a server of a cloud network;
   a wireless transmitter configured to establish a wireless tether between the personal monitoring apparatus and a computing device connected to the server;
   an available low power state configured to conserve energy of the personal monitoring apparatus;
   an input device affixed to the personal monitoring apparatus having a single input mechanism configured to select a third party and direct the computing device, via the wireless transmitter, to submit a web service request to the server, said web service request configured to simultaneously or near simultaneously transmit the user identification information stored on the data storage device and transmit GPS location information stored by the computing device;
   the input device is further configured to select the telephone number stored on the data storage device based on the GPS location information stored by the computing device and open a line of voice or text communication between the personal monitoring apparatus tethered to the computing device and the third party; and
   a means for producing an output signal selected from the group consisting of flashing lights, sounds, vibrations and a combination thereof.

* * * * *